United States Patent [19]

Harvey et al.

[11] 4,348,186
[45] Sep. 7, 1982

[54] PILOT HELMET MOUNTED CIG DISPLAY WITH EYE COUPLED AREA OF INTEREST

[75] Inventors: James F. Harvey, Maitland; Walter S. Chambers, Orlando; John J. Kulik, Longwood, all of Fla.

[73] Assignee: The United States of America as represented by the Secretary of the Navy, Washington, D.C.

[21] Appl. No.: 104,521

[22] Filed: Dec. 17, 1979

[51] Int. Cl.³ ............................................... G09B 9/08
[52] U.S. Cl. ..................................................... 434/44
[58] Field of Search ....................... 434/25, 29, 35, 36, 434/38, 40, 43, 44; 358/104

[56] References Cited

U.S. PATENT DOCUMENTS

| | | | |
|---|---|---|---|
| 3,205,303 | 9/1965 | Bradley | 434/43 |
| 3,515,802 | 6/1970 | Wise | 434/43 |
| 3,862,358 | 1/1975 | Wolff | 434/29 |
| 3,892,051 | 7/1975 | Bunker | 434/43 |
| 4,016,658 | 4/1977 | Porter et al. | 434/41 |
| 4,048,653 | 9/1977 | Spooner | 434/34 |
| 4,103,435 | 8/1978 | Herndon | 358/104 |

OTHER PUBLICATIONS

James F. Harvey, "Current Trends and Issues in Visual Simulation", 1978, pp. 2-5, Proceedings vol. 162.
D. V. Morland, NAVTRAEQUIPCEN 76-C-0048-1, Feb. 1979, Aviation Wide Angle Visual Systems, Computer Image Generator System.
W. Marvin Bunker, AFHRL-TR-78-81, Computer Image Generation, Feb. 1979.

Primary Examiner—Vance Y. Hum
Assistant Examiner—Leo P. Picard
Attorney, Agent, or Firm—Robert F. Beers; Robert W. Adams

[57] ABSTRACT

A system that uses the computer more efficiently in computer generated image displays by allocating priority status to the area being viewed by the observer while progressively diminishing the resolution requirements of the displayed scene toward its perimeter. The video signal corresponds to the orientation of the observer's head which is ascertained by head and eye trackers, and provides a variable level of detail that tends to match the visual acuity of the human eye.

11 Claims, 2 Drawing Figures

PILOT HELMET MOUNTED CIG DISPLAY WITH EYE COUPLED AREA OF INTEREST

BACKGROUND OF THE INVENTION

The present invention relates to the field of display systems, with particular emphasis on the area of computer generated imagery for training purposes.

Generating an image electronically is not a new idea. It was developed some years ago. Relatively recent efforts have expanded the technique significantly as electronic gadgetry became popular to foment a state of art that is now widely conventional at the lower spectrum of sophistication. And, the demand continues to expand, to extort greater capability from available capacity.

Until recently, a computer image generator (CIG) was used rather tentatively in training devices. The need for more image information was recognized but the cost of improving the scene was a burden that exceeded the allotted equipment. Accordingly, numerous approaches have been utilized to render the scene viewed by the trainee more realistic with the equipment on hand. In other words, the objective is efficiency. And it is to that end, that the present invention is oriented.

Ideally, the view observable by a trainee occupying a training device is a perfect reproduction, a total simulation, of a scene realistic to operational conditions. Achievement of that goal may be attainable, but at a very high cost of equipment capacity. Computers are expensive and the amount of computing capacity and bandwidth that would be necessary to faithfully produce a realistic scene over a full field of view would be enormous. The alternatives are to take the approaches of the prior art.

Small scale presentations of virtual images presented close-in to the trainee's eyes have found application in the field. The display is most often projected onto an attachment to a helmet worn by the trainee. Helmets are specially designed for the purpose by incorporating a cathode ray tube, or the like, within the structure, such as is shown by the U.S. Pat. Nos. to Stanton, 3,059,519 and to Bradley 3,205,503. In all such arrangements, the instantaneous field of view is limited and the scene observed by the trainee somehow lacks realism.

Other techniques utilized or attempted include projecting images onto a wind screen, or the like, that is spaced before the trainee. The images may be projected from behind or near the trainee, or from beyond the wind screen as shown in U.S. Pat. No. 3,949,490 to Derderian. The technique is reasonably effective for some applications such as the presentation of flight information, but is less desirable for dimensional scenes than a wide angle viewing screen more remotely spaced from the observer. The best technique for overall realism employs a dome; a dome that encloses the trainee, his simulated vehicle environment if he has one, and the visual arena for the training encounter.

The domed training device presents the scenes that are preplanned for the training session onto the surface of the dome. The dome is spaced apart from the trainee and is most often spherical. It is either reflective or translucent, so that the images are presented from either inside the dome onto its inner surface or from outside by rear projection techniques. Most that have found any utilization have been of the reflective type.

The most elementary of the domed devices simply projects a wide angle view of a movie onto the inner surface of the dome. The next step involves presenting a television projection of a modelboard onto the reflective screen inner surface of the dome. The modelboard is a miniaturized layout not unlike an elaborate toy train setting which has been faithfully reproduced to scale. A gantry mounted television camera can be made to move over the board and view it from various angles to create a scene inside the dome reminiscent of flying. To find acceptance by users the technique has been expanded to link the movements of the camera to the trainee's responses. By that, it has become useful to train vehicle operators. And, the systems have been expanded on by placing the dome on a motion platform. Not only the visual feel of the scene is provided thereby, but also the complementing feel of motion. Realism is heightened.

An approach that has been recently developed as an alternative or addition to the television system is in computer generated imagery (CIG). Images are programmed, and a sequence is projected that is responsive to the operator's controls. The computer is programmed to provide electrical signals that appear as physical objects when displayed. Extensive programming is required, and programming techniques have been originated to place the requirements within the state of the existing art. The size of the undertaking is not fully understood until it is realized that the computer generated image must change not necessarily in a predetermined fashion, but in response to the relatively unpredictable actions of the trainee. But, these requirements have been met, and operational systems are in existence and being used in the pilot training field by commercial firms and the Government.

CIG may occupy a small portion of the display and be supplemented by a separate background, or the computer may be overextended to provide a display over the full field of view. In the latter, the scene lacks definition and realism is discarded. For the system to be useful, more computating equipment and bandwidth have always been the solution. In the former, a contrast of styles and the need for accurate blanking of the television background coincident with the overlayed computer generated image, have been disadvantages. Multiple CIG scenes have been turned to as a solution. A wide angle field of view can be composed of several narrow fields of view separated by blind spots, or in dual channel systems only the primary image, such as an aircraft carrier, is presented with a degree of sophistication. The background is presented with less resolution, requiring less equipment to process it. Problems still stand in the way, however, when the terrain to be presented is complicated.

People have peripheral vision. Not only is the primary area observed noted, but the remainder of the field of view plays a large part in our total sense of space. Most of our attention is directed toward what we look at, but we see adjacent objects well and can recognize others at some distance removed. And, even on the very perimeter of our vision we can detect motion.

The prior art has approached the display question by proposing a full field of uniform resolution, or by proposing a uniform background supporting a spot of higher resolution. Neither has been found to be totally satisfactory, and each has been determined to be unsatisfactory where the responses of an aircraft pilot are to be improved in an arena where terrain is a factor.

The patent to Dr. A. M. Spooner (U.S. Pat. No. 4,048,653) exemplifies the state of the art in the field of the present invention. There, a helmet mounted arrangement for projecting an image into a pilot's line-of-sight is disclosed. The image is presented onto the viewing screen as two images spaced slightly apart, with the right image polarized to be visible by only the right eye of the pilot and the left image similarly polarized for the left eye. The scene viewed may be from any source, although the majority of the disclosure is devoted to describing the optical link between a modelboard and the projection screen. The link includes an optical probe that is slaved to the pilot's head. As the probe is moved forward over the board to simulate flight, the portion to the left is viewed by the probe if the pilot looks left; and the portion to the right is viewed when the pilot looks right.

The patent does not ascend into the confines of computer generated imagery. That arena presents problems that are not addressed by the patent. While it may be possible to generate a high resolution image in motion over a full field of view, it is not practical. Too much computing space and bandwidth would be required. And, the alternatives provide pale imitations of realism, as discussed above.

As system needs have increased, the computers capability has increased, but not at a comparable rate. The number of edges a system can process has gone from 500 in 1972, to 8000 edges for systems that will be operational in 1980. And, although the cost-per-edge has decreased during that period, the total cost has climbed.

Until recently it was felt that still greater capacity for edge processing was required to overcome the cartoonish nature of the images. But, several new techniques by others are beginning to show promise. For example, it has been demonstrated that most of the texture of a scene can be supplied by means other than defining specific edges. Evidence is showing that by far the most efficient approach to producing a given scene is by defining only the main features by edges and then adding a variety of textures to increase realism.

The optimistic developments that have been described only provide us an opportunity to create improvements in time to meet the crushing demand for expansion of the data bases for CIG displays. Recently, normal requirements have not exceeded 100,000 edges, but new requirements soar to over ten million units. Fortunately, other developments are tending to accommodate what would otherwise be a superior task of generating such a data base. First, there is now some understanding of how to use point lights to define features. Second, automated techniques for the generation of data bases are becoming available. And third, object generators with dedicated chips could be developed that contain the features of an item, vehicle, or other object of interest which can be manipulated without placing demands on the data base. The need will nevertheless exist for an efficient computer generated image display, a need that is addressed by the present invention.

An objective and advantage of the present invention is to provide a display of computer generated images that allocates edges or other forms of resolution by proximity to the observer's instantaneous area of interest. Accordingly, available resources of equipment and bandwidth are employed with efficiency to provide a dynamic display that corresponds to the visual acuity of the observer.

The present invention includes a computer generated image that is projected onto a distant screen by apparatus which aligns with a trainee's line of sight, as determined by an eye tracker, and head tracker where desired. The image generator is programmed with a preselected scene arrangement and is responsive to operator actuated controls to simulate a flight, for example. The generator is also responsive to head, and most preferably, eye movements of the operator to apportion definition of the image within the scene displayed.

DESCRIPTION OF A PREFERRED EMBODIMENT

The intended environment for the embodiment of the invention that will be described is as a training device for aircraft pilots. In particular, it has been found that helicopter operators would benefit from the advantages of the present invention and reference to such application will be made for purposes of example. The invention has broad potential, however, for numerous fields in which displays can be used, and all such applications are considered to be within the scope of the present invention.

Figure 1:
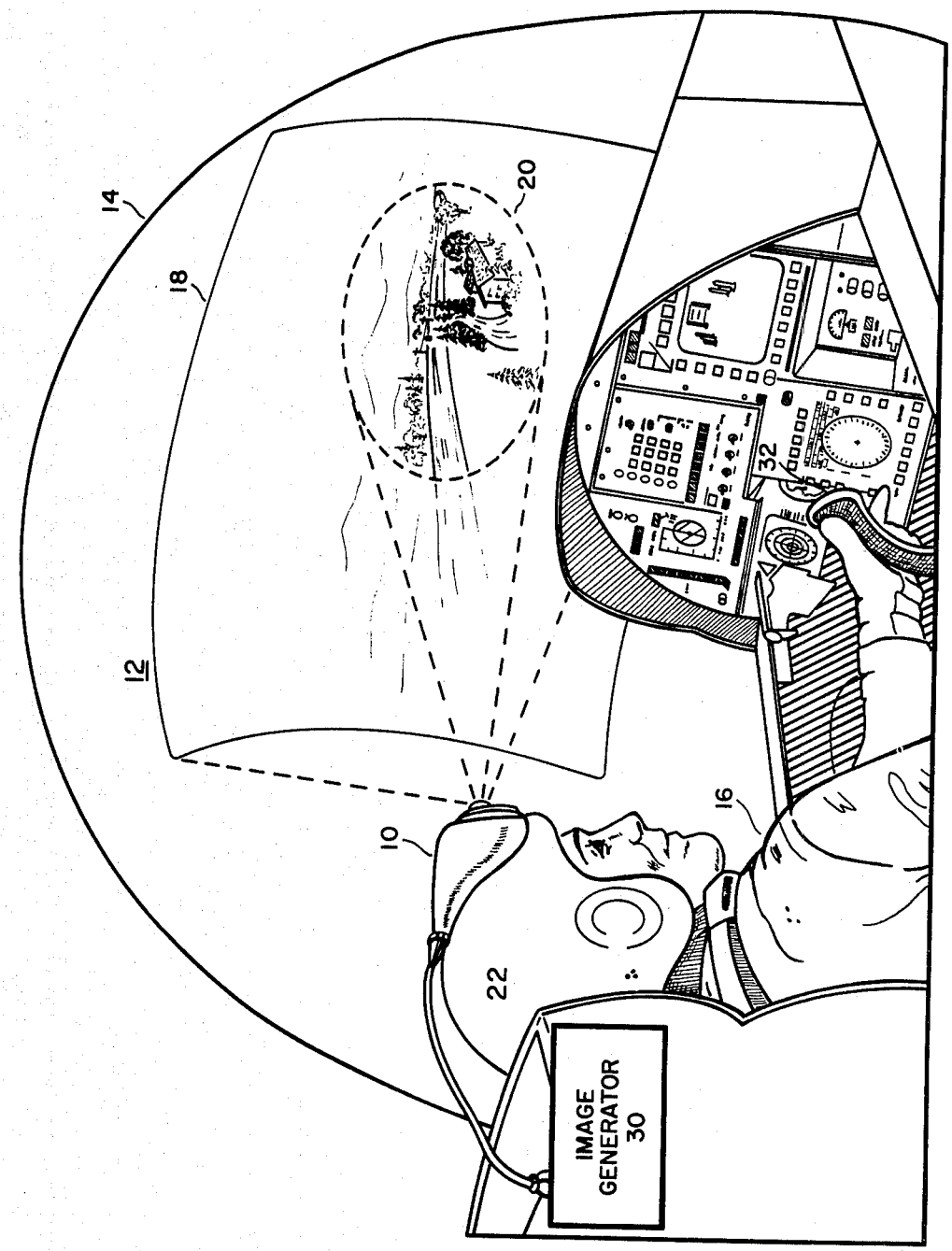
FIG. 1 is a pictorial suggestion of the present invention.

FIG. 1 shows by illustration a primary advantage of the present invention. Helmet mounted projector 10 displays scene 12 onto screen 14, a scene that substantially matches the visual acuity of trainee 16. Scene 12 is shown in the figure to cover only a small portion of the overall area of screen 14, but may be extended, if desired, to occupy the full area of screen 14 that is within the trainee's field of view, including his extreme peripheral vision. As a practical matter, however, efficient use of available resources will dictate that areas residing some distance from the portions in alignment with the trainee's head or eyes will have little or no definition.

And, little is lost of the trainee's perception and sense of realism by limiting the exposed display to the areas adjacent the trainee's instantaneous area of concentration. Within those adjacent areas, definition increases to a level of full resolution at the trainee's then area of interest.

Scene 12 is shown divided into two portions, field of view 18 and area of interest 20. The larger, view 18, is correlated to, and preferably centered about, the trainee's head orientation. This provides a background for that portion of scene 12 that holds the trainee's attention, his then area of interest 20.

The two portions are a single display emanating from a single source, projector 10. Portion 20 is more detailed, corresponding to the foveal resolution of the human eye. Portion 18 is less detailed. The transition in detail may occur in a single step, but preferably would occur in multiple steps up to and including a smooth diminishment through levels that are visually imperceptible. This could be used within the area of larger portion 18 as well as smaller portion 20, but is of particular advantage in whichever portion the trainee's visual acuity is significant.

FIG. 1 shows a sharp demarcation between portion 18 and portion 20, which is a most simple example of the present invention. Preferably, the portions flow together on screen 14 in a smooth or nearly smooth transition. Thereby, the more detailed image of smaller portion 20 appears natural within the setting of view 18 regardless of the location of portion 20.

It is recognized that an embodiment of the present invention which provides for varying levels of detail in field of view 18 is complicated. The complication arises because area of interest 20 is responsive to the trainee's line of sight and may occur anywhere within the displayed scene. To smooth the demarcation line between portions 18 and 20 requires that the image detail in field of view 18 diminish radially from portion 10, wherever it is located. If the trainee's eyes are directed toward the upper left of the displayed scene, the area of field of view 18 adjacent portion 20 in the upper left corner would be more detailed than would the lower right corner. Likewise, the area adjacent portion 20 would be more detailed near the center if the trainee were viewing the center of the display.

While complicated, the embodiment that provides for varying levels of detail in field of view 18 is attainable as an extension of the techniques that will be discussed below. In effect, such an embodiment could transition so smoothly from portion 20 to portion 18 that no demarcation would exist and the two would be as one. The size of portion 20 would then be irrelevant.

A more practical embodiment of the present invention on the basis of simplicity provides for a background of uniform detail with all variances in detail occurring within the area of interest. This approach permits all hierarchal assessments to be correlated to the trainee's line of sight. Accordingly, portion 20 covers an area that is preferably of sufficient size to permit an allocation of detail that blends into the background at its perimeter while matching the visual acuity of the trainee. The area observed, portion 20, then may occur anywhere within field of view 18 without altering the background level of detail in the areas beyond the confines of portion 20. Experimentation is advisable to arrive at a suitable match between the size and detail of portion 18, the characteristics of portion 20, and the visual acuity of observer 16. Some applications of the present invention may be less demanding than others, a factor that can be considered when designing a display employing the invention. For example, it may be sufficient in some applications to approximate, rather than match, the visual acuity of the observer. And, the size of the display may be scaled down at times without significant loss of effectiveness.

Trainee 16 the simulated vehicle of the trainer, and has freedom of movement and "feel" consistent with the corresponding operational aircraft. Simulated flight controls, instrumentation and six-way platform are all available from the existing art for use with the present invention.

Helmet 22 is worn by trainee 16 and includes projector 10. Image generator 30 is most conveniently attached to a fixed mounting, and coupled to projector 10 by flexible means. Other arrangements can be tried that project images in coincidence with the trainee's head orientation and line of sight.

Figure 2:
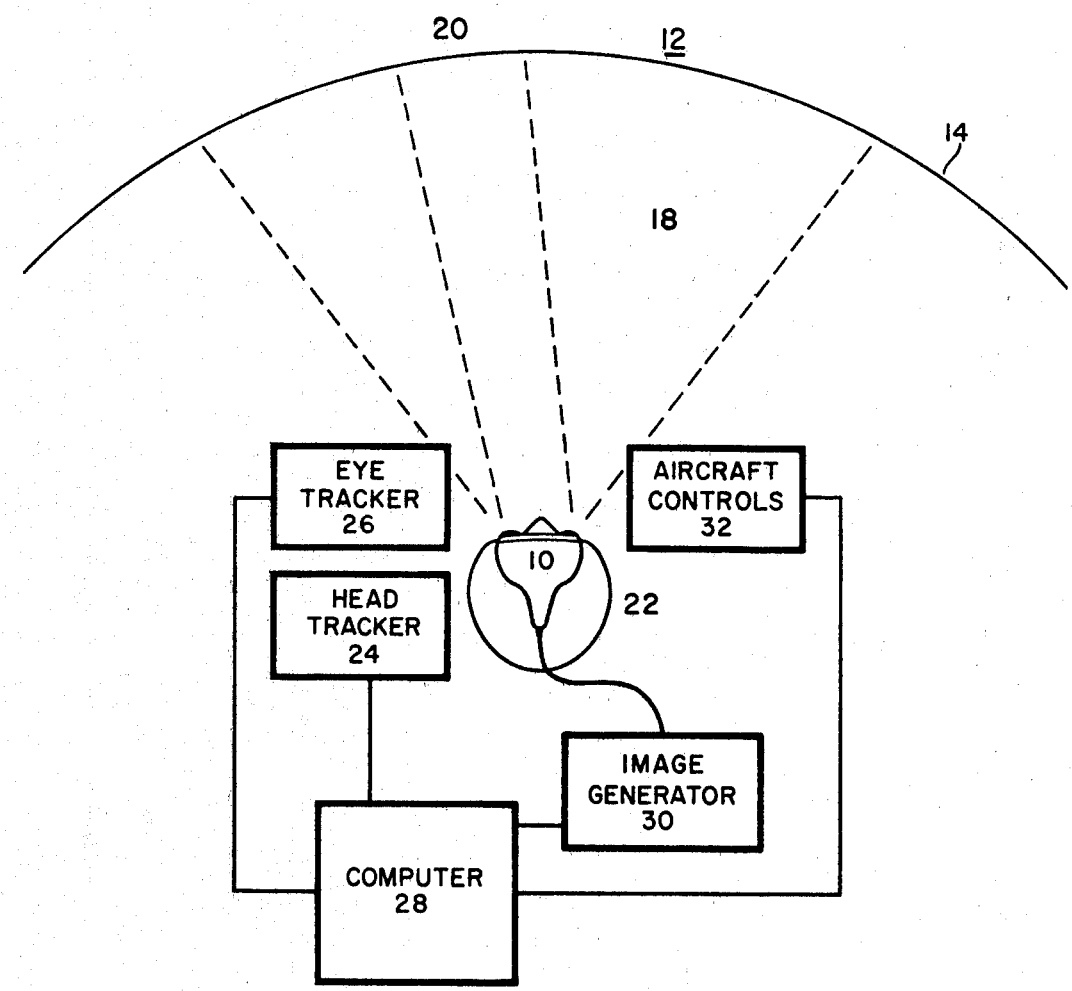
FIG. 2 is a diagram of the present invention, partially in block form showing the systems employed to achieve the foveal display with radially diminishing acuity.

The present invention is shown in different form by FIG. 2. Head tracker 24 and eye tracker 26 are instrumentation that are linked to trainee 16 by optical, or other, means to separately sense his head orientation and eye fixation. A variety of available products can be used as the head tracker, including one or more of the models available from Honeywell Corporation of Minneapolis, Minn., and Polhemus Navigation Systems of Essex Junction, Vt. Conventional eye trackers can also be used, such as models available from Honeywell Electro-Optics of Lexington, Mass., and Gulf and Western Corporation of Waltham, Mass.

Trackers 24 and 26 provide outputs to processor 28 which is the control unit of the trainer. It has been programmed for a flight sequence that may be routine and standard in the art, or unconventional, or new or hereafter developed. The invention may find application in all such sequences. The information from head tracker 24 and eye tracker 26 is processed by computer 28 and coupled to image generator 30, with the programmed sequence, as instructions. Generator 30 is also shown in FIG. 1. The technique used may be one of the conventional approaches available except that the information from eye tracker 26 is used to impose a hierarchal or partitioning standard within scene 18 displayed on screen 14. More image information is allocated to the area corresponding to portion 20, the trainee's area of interest, as identified by eye tracker 26. The hierarchal or partitioning standard is described above in terms of its advantages and objectives, and may be implemented by combining the established programming techniques of ranging with the approaches used in responding to a moving area of interest with two displays, one for background and one for a target. The former is commonly employed in flight trainers and the latter is exemplified by U.S. Pat. No. 3,612,761 to Hanns H. Wolff, entitled "Large Area Display System." Ranging provides ideas for scene enhancement while the latter makes a suggestion for a moving area of interest. Experimentation with all techniques and exploration into new developments will be to the user's advantage in arriving at the most suitable practice of the present invention for the intended application.

In order to generate an area of interest display of the type intended, it is suggested to construct a visual data base in a hierarchal or partitioned manner describing mathematically the objects to be displayed. In each hierarchal level or partition of this data base each object to be displayed is specified with a given level of detail. Area of interest regions could be defined by a set of concentric boundaries that may be of varying shape depending on the application. In displaying objects within the highest level of detail region, the display system selects object definition from the highest level of detail partition or hierarchy of the data base; and, for the lowest level of detail region, from the lowest level of detail partition or hierarchy. Transitions between levels of detail at the regional boundaries could be carried out by varied interpolation procedures which depend upon the display system being utilized.

Processor 28 may be a general research tool, a commercial computer from such as Systems Engineering Laboratory, or a specially designed machine. Image generator 30 may be a Comp-U-Seene from General Electric, or other computer image generator that is compatible with the selected processor unit.

The embodiment described can be used as follows in a helicopter trainer. Trainee 16 occupies simulator 32 and wears specially adapted helmet 22. The training session is initiated by activating the flight programmed earlier into processor 28. Scene 12 is presented onto screen 14, and trainee 16 responds with head, and particularly eye, movements. Head tracker 24 senses the head motion and conveys a set of signals to processor 28 defining the roll, pitch, and yaw of the helmet, and thereby the orientation of the trainee's head. The signals are used to instruct generator 30 to compose the appropriate image for the trainee's field of view. Eye tracker 26 senses the trainee's line of sight with respect to the orientation of his head, and likewise conveys that information in a signal to processor 28. Processor 28 in turn instructs generator 30 to allocate detail in the form of more edges, or otherwise, to the portion of scene 12 that corresponds to the trainee's instantaneous area of interest, and to do so on a hierarchal basis of maximum resolution correlated to the trainee's foveal vision. In addition, processor 28 is responsive to the trainee's activation of simulated aircraft controls 32 to instruct generator 30 to simulate motion in displayed scene 12, and to activate the moveable platform on which the simulated vehicle rests, if one is used as part of the trainer.

When trainee 16 moves his head or changes his line of sight, processor 28 is notified by eye tracker 26 and/or head tracker 24, and instructs generator 30 to alter displayed scene 12 appropriately to maintain the visual match with the trainee while maximizing the efficient use of the computing equipment. The equipment described as being presently available will achieve the purposes of the present invention. Future improvements and developments in equipment will be better suited for the invention and will provide means for improving its responsiveness.

Obviously, many modifications and variations of the present invention are possible in light of the above teachings. It is, therefore, to be understood that within the scope of the appended claims, the invention may be practiced otherwise than as specifically described.

What is claimed is:

1. A display system adaptable as a training device that has the capability of imaging a scene in motion which is responsive to the actions of a trainee and which substantially matches the visual acuity of the human eye with the resolution of the image such that level of detail is allocated by priority to the area of interest then being observed by the trainee, comprising a sight line tracker, display means at least partially within the visual field of view of said trainee for presenting an observable scene of image information coupled thereto, computing means coupled to said tracker for ascertaining the orientation of the trainee's line of sight with respect to said display means, and means coupled to said computing means for electronically generating and providing image information for said display means from stored data by correlating said ascertained line of sight to said scene and allocating image detail in a predetermined hierarchy of resolution about said area that is being observed by said trainee as determined by said ascertained line of sight, whereby said hierarchy of resolution progressively decreases about said line of sight.

2. The display system of claim 1, further comprising a head tracker coupled to said computing means which ascertains the trainee's field of view, and wherein said image generating and providing means further correlates said ascertained field of view to said scene and dedicates said generated and provided image information to said field of view.

3. The display system of claim 1, wherein said display means includes projection apparatus that is responsive to movement of the headgear worn by said trainee.

4. The display system of claim 3, wherein said projection apparatus has a projector mounted atop said headgear and fixedly aligned therewith.

5. The system of claim 4, wherein said display means further includes a domed reflective screen upon which said display is presented that substantially encompasses the trainee's available field of view.

6. The system of claim 1, wherein said image generating and providing means includes an image generating computer programmed to dynamically allocate the available edges on a priority basis to that portion of a preprogrammed scene which corresponds to the area of the display that correlates to the sight line of said trainee.

7. The system of claim 6, wherein said image generating computer is further programmed to allocate edges on a progressively decreasing priority basis radially from said that portion.

8. The system of claim 7, wherein said computing means is a flight computer programmed to digitally detail motion in a preselected sequence to said image generating computer for display on said domed screen by said display means.

9. Training apparatus comprising a simulator that displays a computer generated image having a plurality of concentric regions that are ranked by hierarchy with the innermost region having the highest ranking and each region radially removed therefrom ranked progressively lower, and means for correlating the ranking of each region with the portion of said image that is displayed therein and allocating display detail by region such that the portion of said image in the innermost region has more display detail and the other portions likewise have a level of display detail that corresponds to their respective ranking with the outermost region having the least display detail, and further comprising means correlated to said display which identifies an observer's area of visual interest of said display for positioning said innermost region to correspond with said area of visual interest, such that resolution in said display decreases radially from said area of interest.

10. The apparatus of claim 9, wherein said simulator further comprises means for rendering motion in said image and relocation of said concentric regions on said display such that image portions may move from one region to another and regions may be moved across the image, wherein display detail is automatically adjusted by said correlating and allocating means for portion by region.

11. A flight simulator for training aircraft operators, comprising:
a simulated aircraft cockpit with simulated aircraft controls that are responsive to actuation by said operator;
a display screen substantially encompassing the field of view of said operator occupying said cockpit;
a head tracker that continuously measures the orientation of the operator's head;
an eye tracker that continuously measures the operator's line of sight;
a computer image generator;
processing means coupled to said simulated aircraft controls, said head tracker and said eye tracker for computing instructions for said image generator in response to said actuation and said measurements of head orientation and line of sight corresponding to a preselected flight sequence;
means associated with said image generator for presenting a visual display on said screen; and
means associated with said image generator for automatically allocating image detail by area in a predetermined set of concentric regions that are centered around the line of sight of said operator, with the region that intersects the operator's line of sight allocated to have more image detail than the other region(s) to form a display that approximately matches the visual acuity of the observer.

* * * * *